(12) United States Patent
Pillai

(10) Patent No.: US 7,280,070 B2
(45) Date of Patent: Oct. 9, 2007

(54) ROBUST OPTIMAL SHADING SCHEME FOR ADAPTIVE BEAMFORMING WITH MISSING SENSOR ELEMENTS

(76) Inventor: Unnikrishna Sreedharan Pillai, 432 Harriot Ave., Harrington Park, NJ (US) 07640

( * ) Notice: Subject to any disclaimer, the term of this patent is extended or adjusted under 35 U.S.C. 154(b) by 396 days.

(21) Appl. No.: 11/000,156

(22) Filed: Nov. 30, 2004

(65) Prior Publication Data
US 2006/0114148 A1  Jun. 1, 2006

(51) Int. Cl.
*G01S 7/40* (2006.01)
(52) U.S. Cl. .................... 342/195; 342/174
(58) Field of Classification Search ........... 342/195
See application file for complete search history.

(56) References Cited

U.S. PATENT DOCUMENTS

| | | | |
|---|---|---|---|
| 4,809,184 A * | 2/1989 | O'Donnell | 600/437 |
| 5,559,757 A * | 9/1996 | Catipovic et al. | 367/134 |
| 5,677,696 A * | 10/1997 | Silverstein et al. | 342/360 |
| 5,929,809 A * | 7/1999 | Erlick et al. | 342/372 |
| 6,084,541 A * | 7/2000 | Sayegh | 342/354 |
| 6,307,507 B1 * | 10/2001 | Gross et al. | 342/373 |
| 2006/0241914 A1 * | 10/2006 | Barnard et al. | 702/189 |

FOREIGN PATENT DOCUMENTS

WO  WO0150406 A1 *  7/2001

OTHER PUBLICATIONS

Liu, S.C. "A Fault Correction Technique for Phased Array Antennas". Antennas and Propagation Society International Symposium, 1992. vol. 3. Jul. 18-25, 1992. pp. 1612-1615.*
Peters, T.J. "A Conjugate Gradient-Based Algorithm to Minimize the sidelobe Level of Planar Arrays with Element Features". IEEE Transactions on Antennas and Propagation. vol. 39, Issue 10. Oct. 1991. pp. 1497-1504.*
Yeo et al. "Array Failure correction with a Genetic Algorithm". IEEE Transactions on Antennas and Propagation. vol. 47, Issue 5. May 1999. pp. 823-828.*
Zainud-Deen et al. "Array Failure Correction with Orthogonal Method". Proceedings of the Twenty-First National Radio Science Conference. Mar. 16-18, 2004. pp. B7 1-9.*

* cited by examiner

*Primary Examiner*—Thomas H. Tarcza
*Assistant Examiner*—Matthew M Barker
(74) *Attorney, Agent, or Firm*—Walter J. Tencea, Jr.

(57) ABSTRACT

A new technique for re-computing shading parameters for low sidelobe levels for a radar or sonar system is disclosed. When some of the sensor elements become inoperative, remaining shading parameters are recomputed using a new constraint. This approach leads to an overall gain pattern that is superior compared to the one without re-computing the weights.

13 Claims, 11 Drawing Sheets

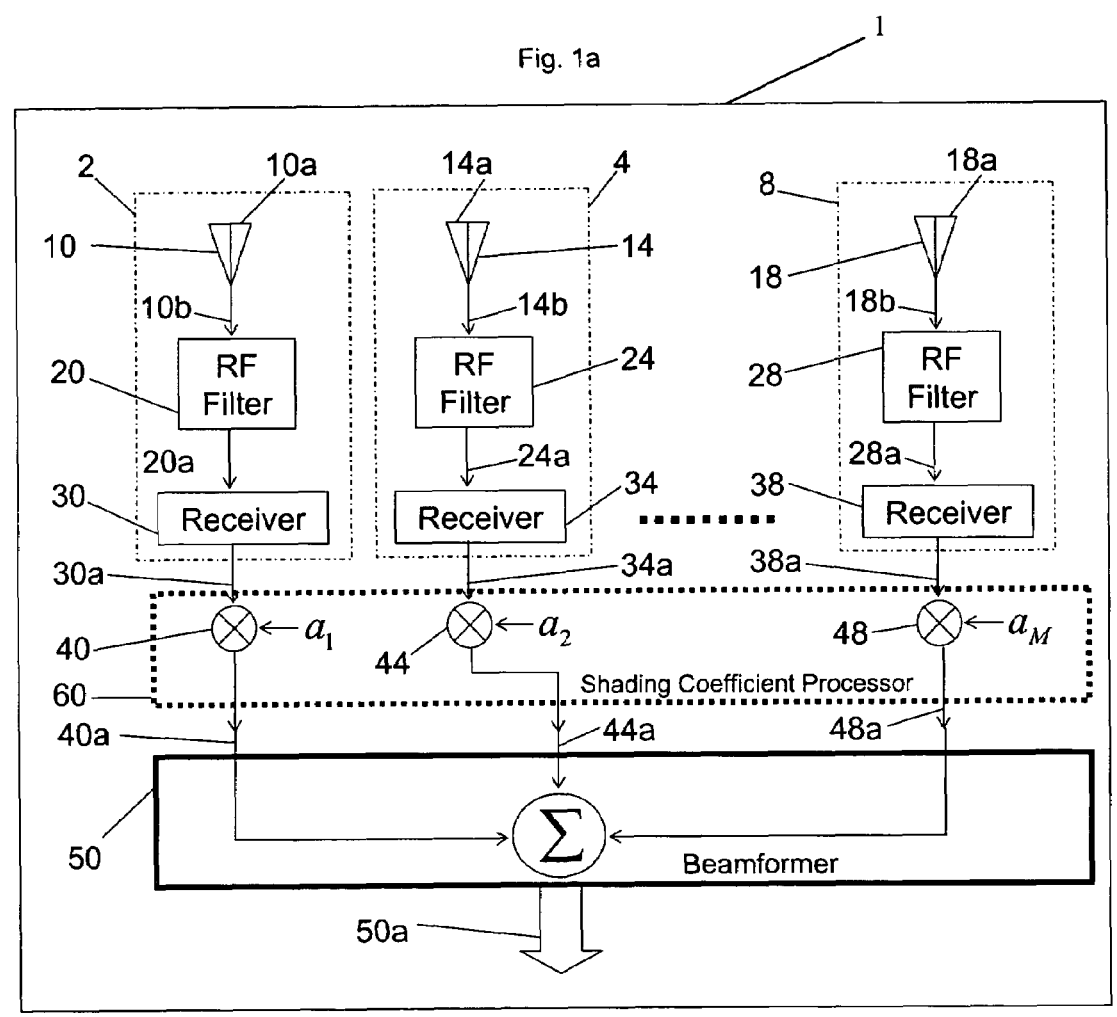

Fig. 4.a
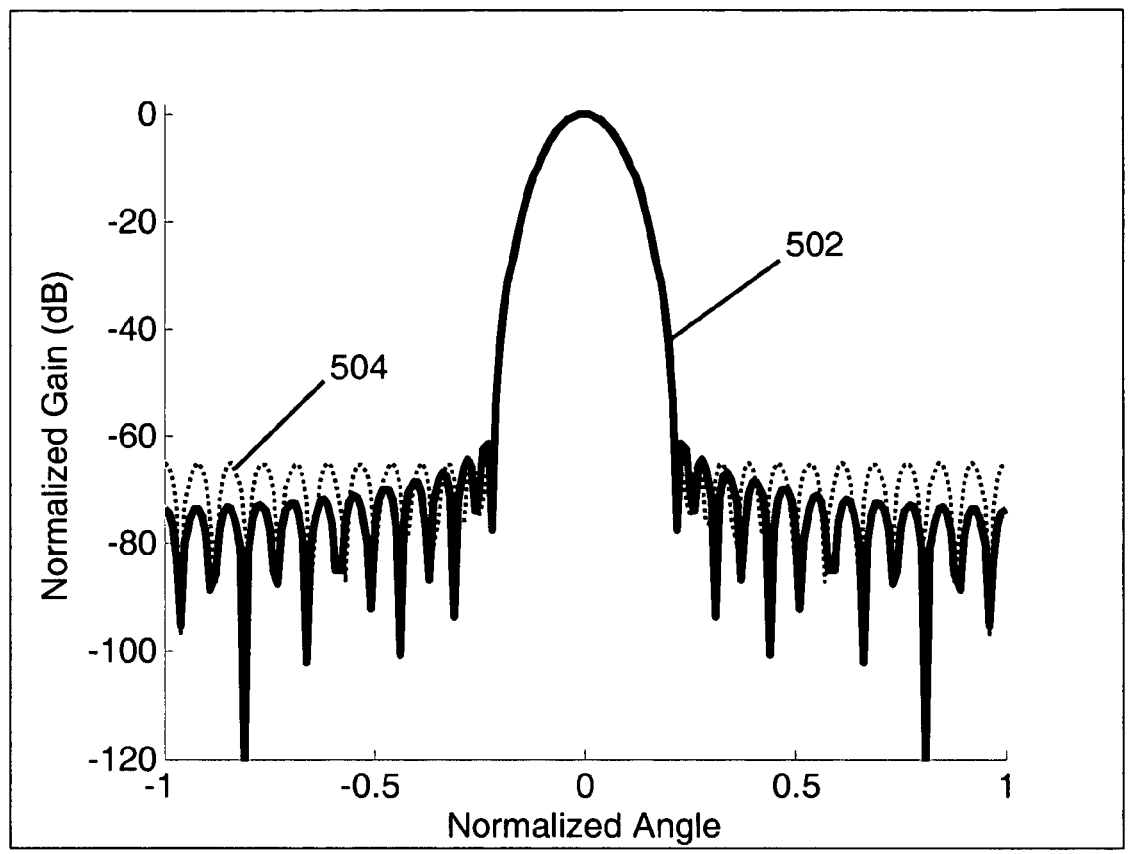
Fig. 4.b
| $a_i$, $i = 1 \rightarrow 13$ | $a_i$, $i = 14 \rightarrow 25$ |
|---|---|
| 0.0028 | 0.3459 |
| 0.0089 | 0.3221 |
| 0.0204 | 0.2856 |
| 0.0390 | 0.2407 |
| 0.0660 | 0.1921 |
| 0.1015 | 0.1444 |
| 0.1444 | 0.1015 |
| 0.1921 | 0.0660 |
| 0.2407 | 0.0390 |
| 0.2856 | 0.0204 |
| 0.3221 | 0.0089 |
| 0.3459 | 0.0028 |
| 0.3541 | |

Fig. 5.a
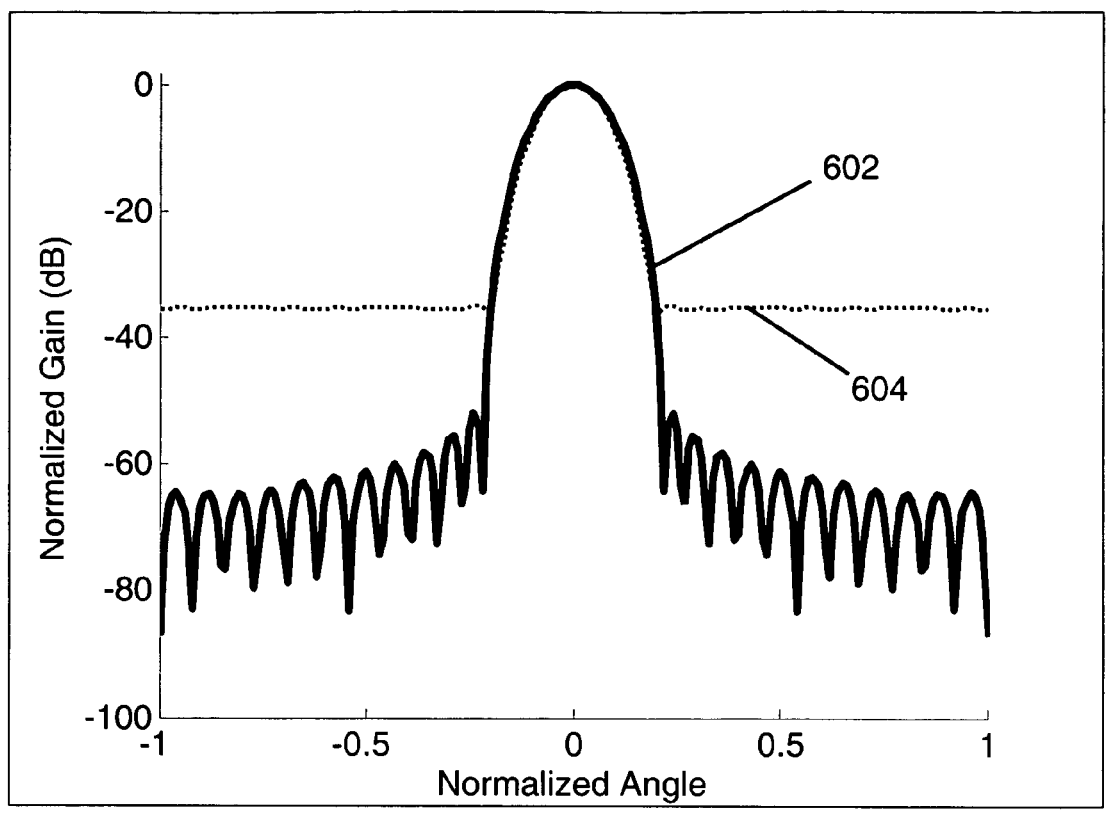
Fig. 5.b
| $a_i$, $i = 1 \rightarrow 13$ | $a_i$, $i = 14 \rightarrow 25$ |
|---|---|
| -0.0034 | 0.3649 |
| -0.0063 | 0.3702 |
| -0.0084 | 0.3552 |
| -0.0072 | 0.3222 |
| 0 | 0.2757 |
| 0.0163 | 0.2217 |
| 0.0435 | 0.1665 |
| 0.0823 | 0.1157 |
| 0.1315 | 0.0732 |
| 0.1876 | 0.0410 |
| 0.2453 | 0.0194 |
| 0.2981 | 0.0067 |
| 0.3398 | |

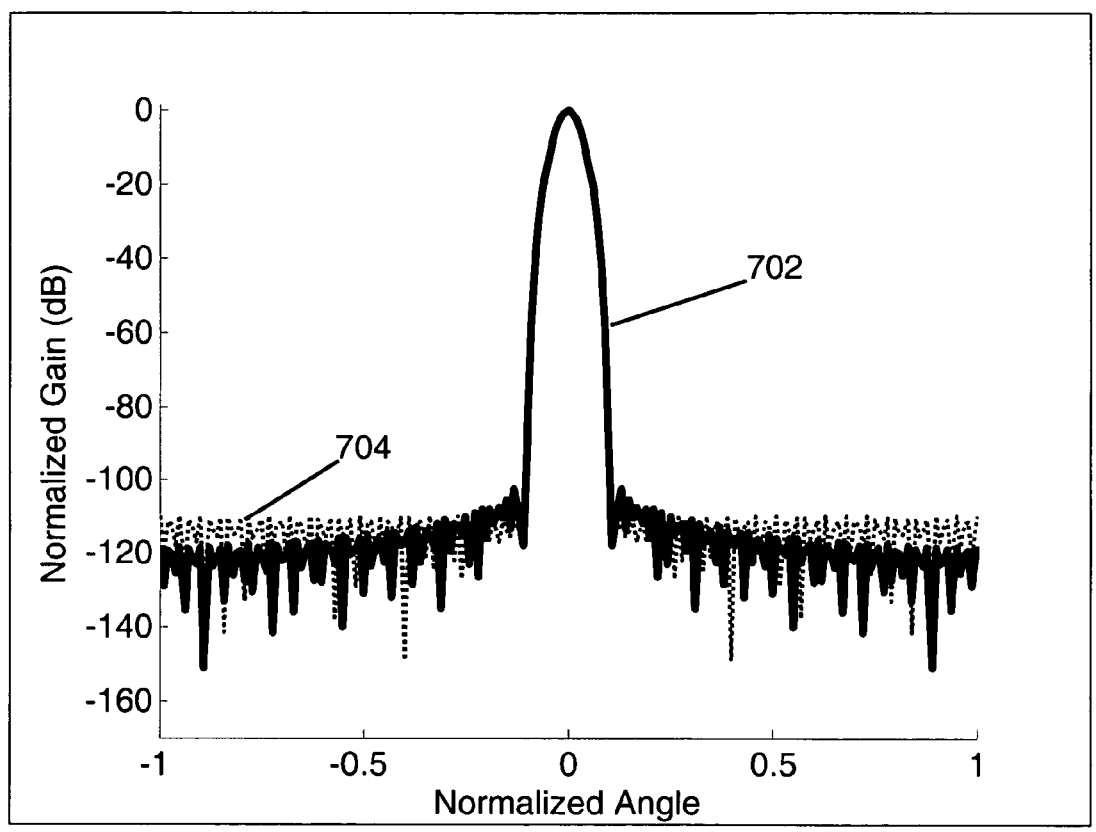
Fig. 6.a

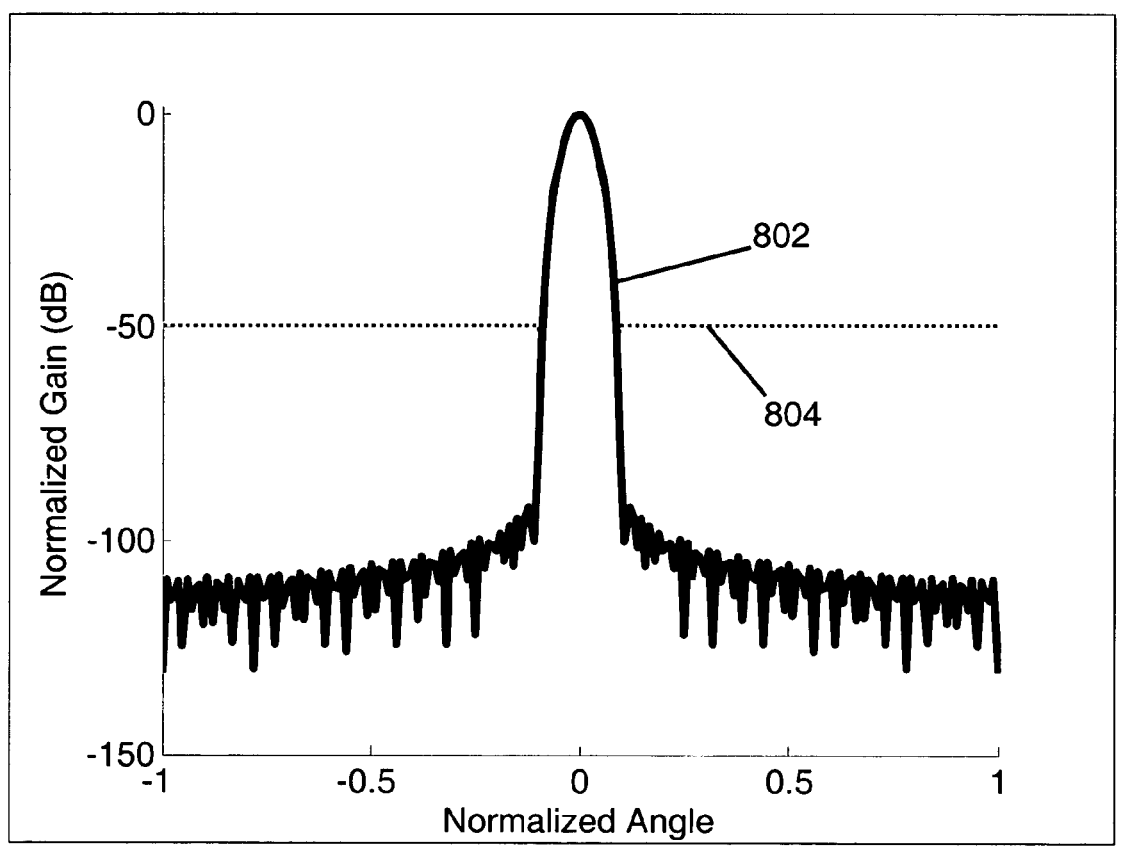
Fig. 6.b

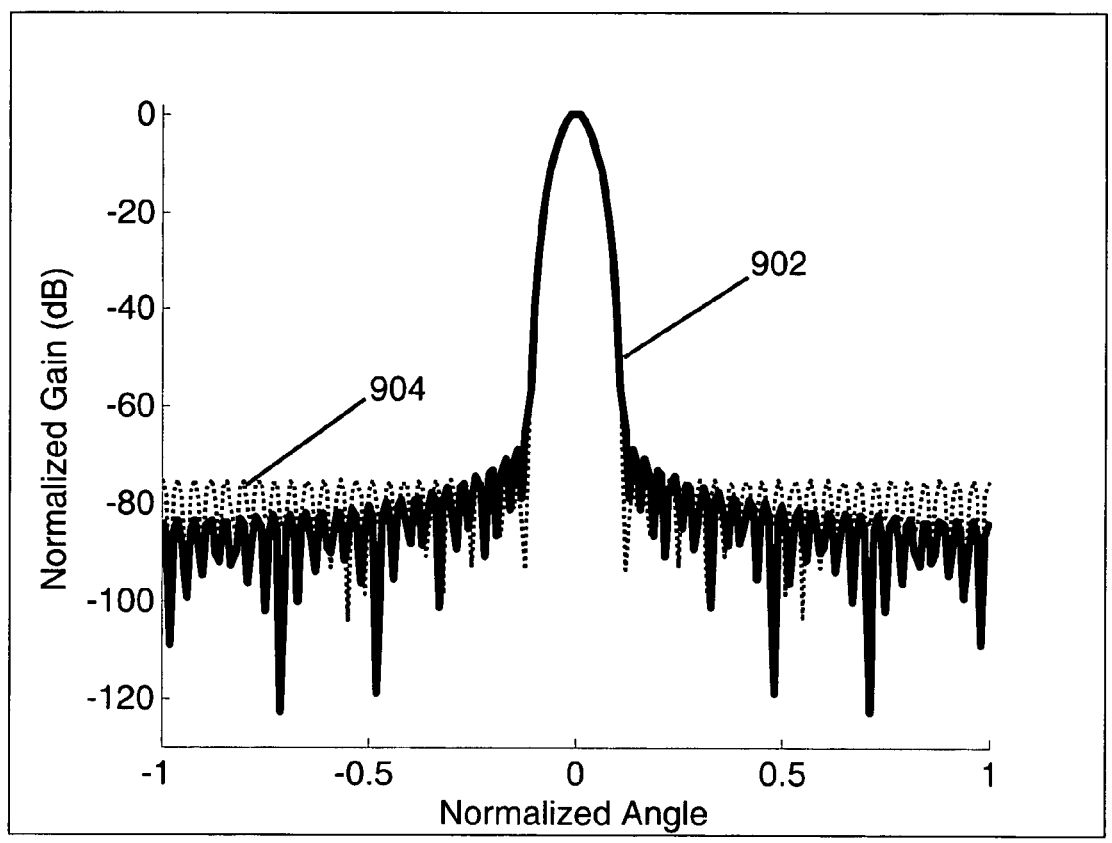
Fig. 7.a

Fig. 7.b
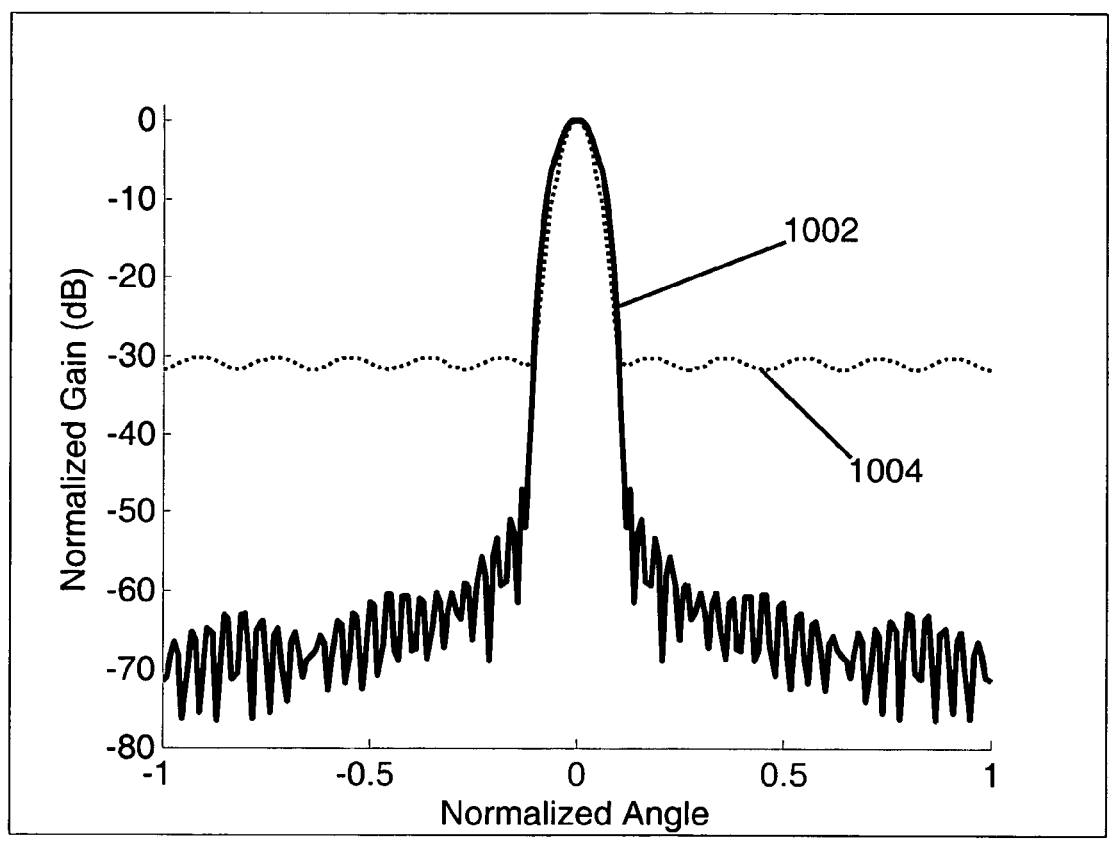

ROBUST OPTIMAL SHADING SCHEME FOR ADAPTIVE BEAMFORMING WITH MISSING SENSOR ELEMENTS

STATEMENT REGARDING FEDERALLY SPONSORED RESEARCH OR DEVELOPMENT

The present invention is based upon work supported and/or sponsored by the Air Force Research Laboratory (AFRL), Rome, N.Y. under Contract No. FA8750-04-C-0202.

FIELD OF THE INVENTION

This invention relates to improving target detection and estimation performance and apparatus concerning optimal beamforming using radar and sonar.

BACKGROUND OF THE INVENTION

An important problem in conventional beamforming (CBF) in radar or sonar using a set of sensors is to determine the shading coefficients (weights) to be applied at the output of each sensor for superior sidelobe reduction. Shading coefficients help to reduce the sidelobes at the expense of a slight increase in the main lobe widths. The approach is to maximize the energy over the main beam and minimize the energy over the sidelobes by holding the total energy to be constant. This is realized by superimposing a window of suitable arbitrary shape and width over the main beam. Ideally these shading coefficients should be robust enough so as not to generate significant performance degradation when one or more of the sensors become inoperative.

In this context, let $\{a_k\}_{k=1}^{M}$ represent the shading coefficients for a uniform linear array with M sensors as shown in FIG. 1a. FIG. 1a includes sensors 10, 14, and 18. FIG. 1a also includes shading weights 12, 16, and 20. Sensor 10 has a shading weight of $a_1$, sensor 14 has a shading weight of $a_2$, sensor 18 has a shading weight of $a_M$. With $$\omega = \pi \sin \theta \quad (1)$$

representing the normalized look-direction, where $\theta$ represents the physical look direction (or arrival angle) from the broadside of the array of sensors. From 10, 14, and 18, the array factor and the array gain pattern are given by $$A(\omega) = \sum_{k=1}^{M} a_k e^{-jk\omega} \text{ and} \quad (2)$$

$$G(\omega) = |A(\omega)|^2 = \left| \sum_{k=1}^{M} a_k a_k e^{-jk\omega} \right|^2 \quad (3)$$

respectively. A typical array gain pattern or the prior art is as shown in FIG. 1b. with a dominant main beam 102 having a width W1, surrounded by sidelobes 104a and 104b. The goal of the shading weights such as $a_1$, $a_2$, and $a_M$ is to enhance the main lobe 102 while maintaining the sidelobes 104a and 104b to be as uniform as possible. Further the sidelobes 104a and 104b should be robust enough so as to maintain similar low sidelobe structure when one or more of the sensors, such as 10, 14, or 18 of FIG. 1a become inactive. With equal shading for an M element array, Eq. (3) gives rise to the standard gain pattern $$G_1(\omega) = \left( \frac{\sin(M\omega/2)}{\sin(\omega/2)} \right)^2, \quad (4)$$

and with triangular shading weights $$a_k = \begin{cases} k, & k \leq M/2 \\ M-k, & k > M/2 \end{cases} \quad (5)$$

the gain pattern simplifies to $$G_2(\omega) = \left( \frac{\sin\{(M+1)\omega/4\}}{\sin(\omega/2)} \right)^4. \quad (6)$$

Compared to (4), notice that the sidelobe levels in (6) have been reduced by a factor of two (in the dB scale) while the main beam width has gone up by an undesirable factor of two as well. Thus shading helps to reduce the sidelobe level. However, the weights in (5) are not particularly attractive since their dynamic range is quite large especially for large arrays. In this context, Dolph-Chebyshev shading weights are widely used in practice since for a given sidelobe level, they achieve the minimum transition band thereby maintaining an optimum main lobe width as specified in "Array Signal Processing," by S. U. Pillai, Springer-Verlag, N.Y., 1989, and "Array Signal Processing: Concepts and Techniques," by Don H. Johnson and Dan E. Dugeon, PTR Prentice-Hall, 1993.

Most of the shading schemes such as Dolph-Chebyshev, Kaiser windows, Blackman-Harris windows assume a uniformly placed linear array of sensors, such as sensors 10, 14, 18, the spacing being $\lambda/2$, and this assumption is often violated in practice when hydrophones, such as 10, 14, and 18 become inoperative. In such a situation, if for example the $m^{th}$ hydrophone becomes non-operational, the actual gain pattern in (3) becomes $$G_m(\omega) = \left| \sum_{\substack{k=1 \\ k \neq m}}^{M} a_k e^{-jk\omega} \right|^2. \quad (7)$$

In general, the array gain pattern associated with missing sensor elements have much worse sidelobe levels compared to its original counterpart. In this context it is desirable to have a set of shading coefficients whose performance degradation with respect to sidelobe suppression is graceful under missing sensors or sensor failures.

SUMMARY OF THE INVENTION

The present invention provides in one or more embodiments a new robust technique for estimating the shading weights for conventional beamforming. The technique is subject to the condition that the method typically must be robust enough so as to maintain acceptable performance in terms of sidelobe suppression even when some of the sensors become non-operational. By making use of the energy constraint of the array gain factor, the optimization goal is to maximize the energy in the desired main beam while holding the total energy constant. This procedure leads to finding the "largest" eigenvector corresponding to a positive-definite Toeplitz matrix for the desired shading vector. In the case of missing sensors, the original positive definite symmetric matrix is "shrunk" by deleting the rows and columns corresponding to the missing sensors, and the eigenvector associated with the largest eigenvalue of the reduced matrix represents the desired recomputed shading coefficients. The technique of one or more embodiments of the present invention is typically not iterative (unlike prior art techniques disclosed in "Conjugate gradient-based algorithm to minimize the sidelobe level of planar arrays with element failures", by J. Peters, IEEE Trans. Antennas Prop., 39, 1497-1504 (1991), "Linear Array Failure Correction by Perturbing the Excitations of some Elements with a Genetic Algorithm", by J. A. Rodriguez, et. al., ECCOMAS 2000, Sep. 11-14, 2000, "Chebyshev-like Low Sidelobe Beam patterns with Adjustable Beam width and Steering-Invariance," by G. Abreu and R. Kohno, European Wireless Conference, February 25-28). In addition, the power method may be used to compute the largest eigenvector when the size of the matrix is large. In one or more embodiments of the present invention, the following problem is addressed: How to compensate for the missing sensors in an array of sensors by recomputing the remaining shading weights so that the new array gain pattern obtained is as close to that of the original array as possible? The new method should have the following robust features:

(i) The new method should not depend on uniform placement of sensors and hence must address the optimum array gain problem from a non-traditional viewpoint.

(ii) Knowing the location of the missing sensors, the new method should allow recomputation of the shading weights so that the degradation in array gain is minimum.

(iii) The shading weights generated should not possess a very large dynamic range among them as this tends to make the heavily shaded sensors more "critical" in the sense that their malfunctioning may generate an unacceptable overall array gain pattern.

Condition (iii) practically forces an energy constraint such as $$\sum_{i=1}^{M} |a_i|^2 = E \quad (8)$$

on the shading weights. Using Parseval's theorem applied to (2)-(3), observe that (8) is equivalent to the array gain pattern constraint $$\int_{-\pi}^{\pi} G(\omega)d\omega = \int_{-\pi}^{\pi} |A(\omega)|^2 d\omega = \sum_{i=1}^{M} |a_i|^2 = E. \quad (9)$$

Equation (9) states that the total area under the gain pattern $G(\omega)$ is maintained to be a constant. Notice that the area under the array gain pattern also represents the total energy put out by the array.

BRIEF DESCRIPTION OF THE DRAWINGS

FIG. 1a shows an M element linear array of a plurality of sensors and a plurality of gain adjustment devices with shading weights;

FIG. 4a shows an optimum gain pattern for a twenty-five element (or twenty-five sensor) uniform array using the proposed shading scheme and a Dolph-Chebyshev gain pattern with negative sixty-five dB sidelobe level;

FIG. 4b shows a chart of optimum shading weights using a proposed method of an embodiment of the present invention;

FIG. 5a shows an optimum gain pattern for a twenty-five element uniform array of sensors using a proposed shading method in accordance with an embodiment of the present invention;

FIG. 5b shows a table of optimum recomputed shading weights using a method of an embodiment of the present invention with a fifth sensor missing (corresponds to the solid curve in FIG. 5a);

FIG. 6a shows a curve (dotted line) of optimum gain patterns with all sensors present for the Dolph-Chebyshev shading scheme with—one hundred and ten dB (decibels) of sidelobe attenuation and the shading scheme of an embodiment of the present invention as a solid line when all sensors are present;

FIG. 6b shows a diagram of array gain patterns with a sixty-fifth sensor missing and remaining shading weights as in FIG. 6a. The new method with recomputed shading weights is shown as one curve (solid line) and a Dolph-Chebyshev shading scheme with a sixty-fifth sensor missing and one hundred and ten decibels of sidelobe attenuation is shown as another curve (dotted line);

FIG. 7a shows a diagram of an Optimum gain pattern with all sensors present using the Dolph-Chebyshev shading scheme with negative seventy-five dB (decibels) sidelobe attenuation (dotted line), and the shading method of an embodiment of the present invention (solid line); and FIG. 7b shows array gain patterns with sixth and seventeenth sensors missing and remaining shading weights as in FIG. 7a, for Dolph-Chebyshev shading scheme with negative seventy-five dB (decibels) of sidelobe attenuation (dotted line) and the recomputed shading scheme using the new method (solid line).

DETAILED DESCRIPTION OF THE DRAWINGS

Figure 1B:
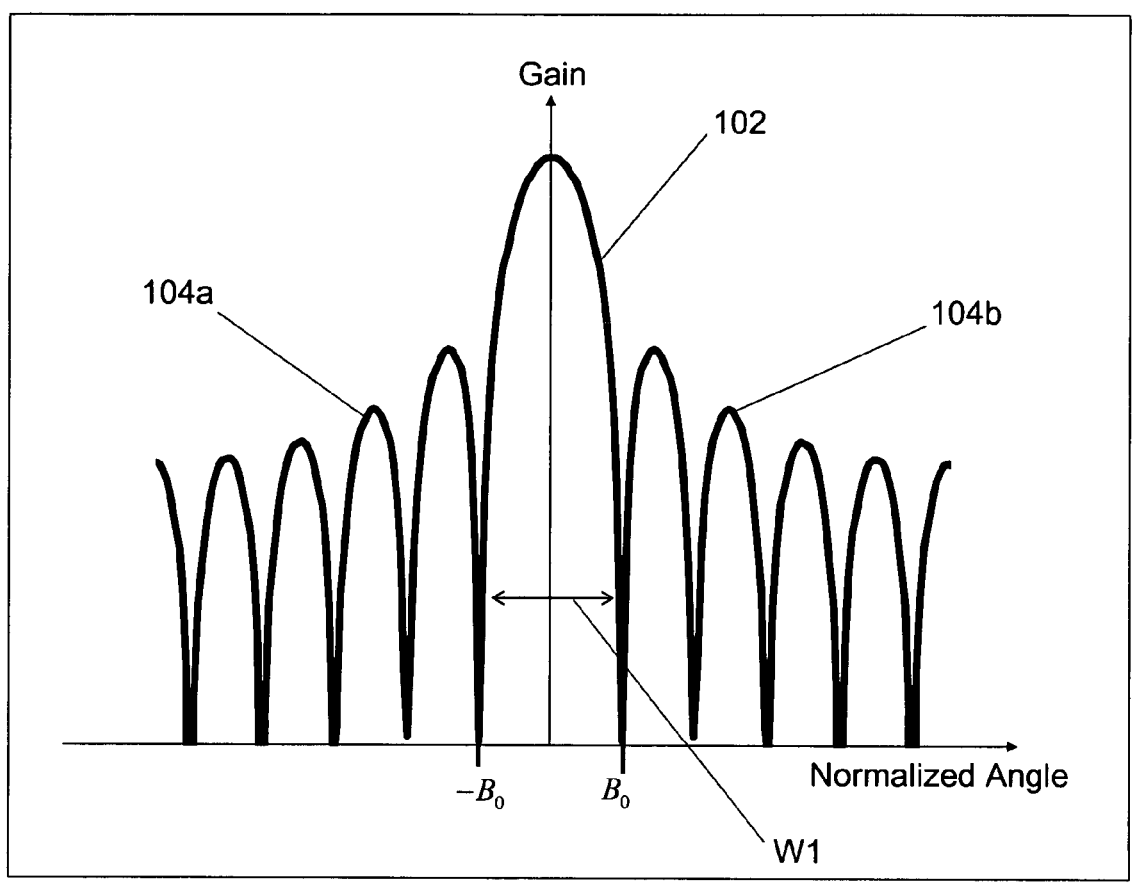
FIG. 1b shows a radar or sonar gain pattern including a main beam and sidelobes which may be produced by a conventional beamformer.

FIG. 1a shows an apparatus 1 with a uniform linear array of M elements comprised of sensors 2, 4, and 8, and a plurality of further sensors not shown. "M" is the total number of sensors in the apparatus 1.

Sensors 2, 4, and 8 are comprised of antennas 10, 14, and 18, respectively, and a plurality of further antennas not shown. Sensors 2, 4, and 8 are also comprised of radio frequency ("RF") filters 20, 24, and 28, respectively, and a plurality of further RF filters not shown and receivers 30, 34, and 38, respectively, and a plurality of further receivers not shown. Sensors 2, 4, and 8 are also comprised of devices 40, 44, and 48, respectively, and a plurality of further devices not shown. The apparatus 1 includes a beamformer 50. The apparatus 1 also includes a shading coefficient processor 60.

The antennas 10, 14, and 18 have inputs 10*a*, 14*a*, and 18*a*, respectively, and outputs 10*b*, 14*b*, and 18*b*, respectively. The RF filters 20, 24, and 28 are electrically connected to the antennas 10, 14, and 18 and the outputs 10*b*, 14*b*, and 18*b* of the antennas 10, 14, and 18, respectively, are the inputs to the RF filters 20, 24, and 28 respectively. The RF filters 20, 24, and 28 have outputs 20*a*, 24*a*, and 28*a*. The RF filters 20, 24, and 28 are electrically connected to the receivers 30, 34, and 38, respectively, and the outputs 20*a*, 24*a*, and 28*a* of the RF filters 20, 24, and 28 are the inputs to the receivers 30, 34, and 38, respectively. The receivers 30, 34, and 38 have outputs 30*a*, 34*a*, and 38*a*, respectively. The receivers 30, 34, and 38 are electrically connected to the devices 40, 44, and 48, respectively, and the outputs 30*a*, 34*a*, and 38*a* are the inputs to the devices 40, 44, and 48, respectively. The devices 40, 44, and 48 have outputs 40*a*, 44*a*, and 48*a*.

The devices 40, 44, and 48 are electrically connected to the beamformer 50, and the outputs 40*a*, 44*a*, and 48*a* of the devices 40, 44, and 48 are inputs to the beamformer 50. The beamformer 50 has an output 50*a*.

In operation, a signal is received at each of the inputs 10*a*, 14*a*, and 18*a* of the antennas 10, 14, and 18, respectively. Each signal may be received as an electromagnetic signal. Each of antennas 10, 14, and 18 sends its received signal to its corresponding RF filter of filters 20, 24, and 28. Each of RF filters 20, 24, and 28, filters its received signal to form an RF filtered signal and then sends its RF filtered signal to its corresponding receiver of receivers 30, 34, and 38. Each of receivers 30, 34, and 38 modifies its RF filtered signal to form a modified signal and sends its modified signal to its corresponding device of devices 40, 44, and 48. Each of devices 40, 44, and 48 further modifies its modified signal to form a further modified signal and sends its further modified signal to an input of beamformer 50. The beamformer 50 sums the further modified signals received from devices 40, 44, and 48 to form a summation signal at output 50*a*.

The devices 40, 44, and 48 may further modify the modified signal by applying a shading coefficient to the modified signal. The devices 40, 44, and 48 may apply shading coefficients $a_1$, $a_2$, and $a_3$, respectively. The antennas 10, 14, and 18 may each be or may be replaced by an electromagnetic antenna or sensor element. The devices 40, 44, and 48 may be part of a shading coefficient processor 60.

The shading coefficients are applied by devices 40, 44, and 48 to reduce sidelobes of the beam (or output signal) formed at output 50*a*. The weighted outputs at outputs 40*a*, 44*a*, and 48*a* are then combined in a standard beamformer 50 to form an antenna beam (or output signal) at output 50*a* in a specific direction. The shading weights (also called shading coefficients) so applied, guarantee uniformly low sidelobes for all such beams.

After shading coefficients are applied the beamformer 50 applies additional weights to look in a specific direction. This direction (or look angle) is determined by the user according to the application.

When one or more sensors of 2, 4, 8 or any further sensors fail, the signals are compensated in the array by using modified shading weights in accordance with one or more embodiments of the present invention.

Beamforming is applied to focus to a specific direction as before. By applying the modified shading weights or coefficients at each element or at each of devices 40, 44, and 48, one or more embodiments of the present invention essentially reconstruct signals that would have appeared as if the failed elements were present.

Figure 1C:
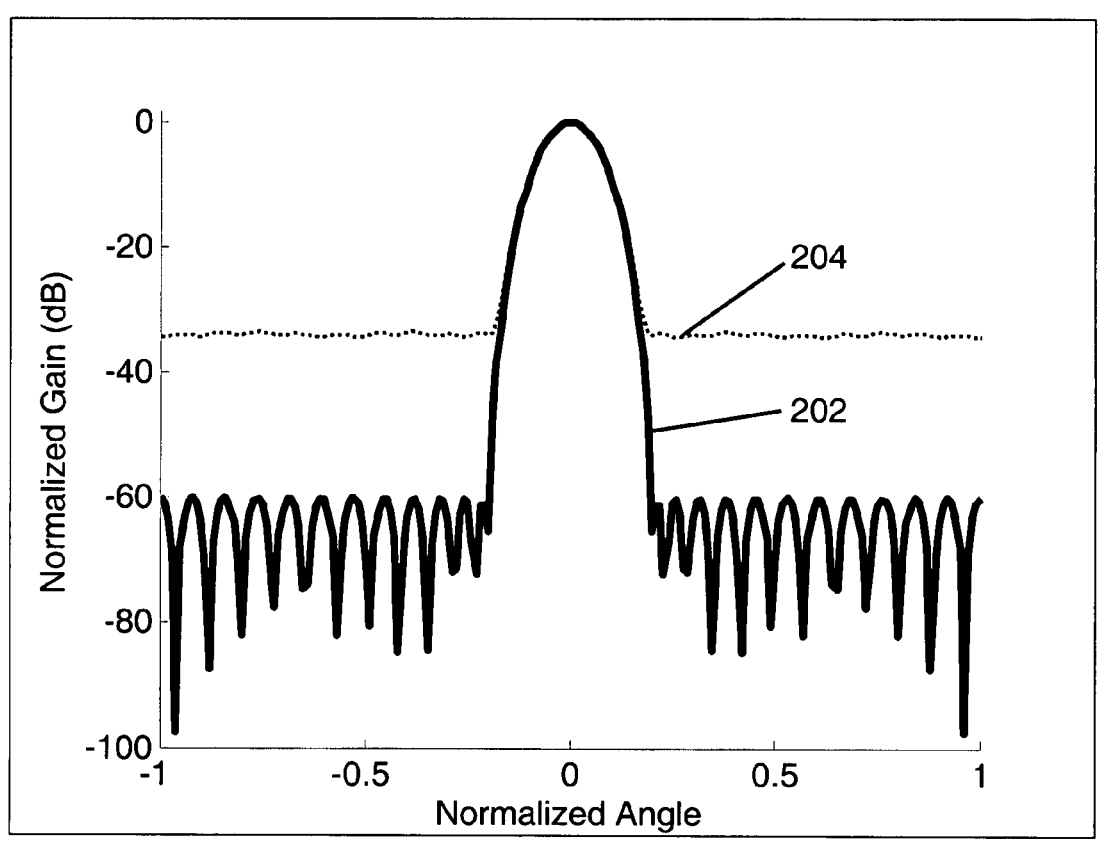
FIG. 1c shows a radar or sonar gain pattern with Dolph-Chebyshev shading for a twenty five element uniform array with sixty dB (decibels) sidelobe level.

FIG. 1*b* shows an array pattern or total signal output at output 50*a* when all of the sensors 2, 4, and 8 and any further sensors of FIG. 1*a* are operational, i.e. none have failed. The total signal output includes a main beam 102 and sidelobes 104*a* and 104*b*. FIG. 1*c* shows two array gain pattern or total signal outputs at output 50*a* for a twenty sensor uniform array with Dolph-Chebyshev shading coefficients with sixty dB (decibels) sidelobe level for two cases. The first case, shown by the solid curve 202, is for when all twenty sensors (such as sensors 2, 4, and 8 and a further plurality not shown) are operational. The second case, shown by the dotted curve 204 combined with the solid curve for the main beam area, is for when a fifth sensor (from left in the diagram of FIG. 1*a*) of a twenty sensor uniform array is missing. Eliminating the fifth sensor is only an example, and in practice any one of the sensors of the array can be eliminated, i.e. can become non operational.

In FIG. 1*c*, decibels are shown plotted on the y-axis versus distance from the highest gain plotted on the x-axis. FIG. 1*c* shows that the performance degradation as a result of the fifth sensor being absent is about thirty dB. The sidelobes with all sensors present (curve 202) are thirty dB less than the sidelobes with the fifth sensor missing (dotted curve 204).

For the purpose of this application, a uniformly placed array of sensors means that each antenna of the sensors is the same distance from adjacent antennas. For example, if there are three antennas in the array, the first antenna, would be x meters from the second antenna, and the second antenna, would be x meters from the third antenna. However, the first antenna would be 2x meters from the third antenna. In FIG. 1*a*, the antenna 10 may be x meters from the antenna 14. The antenna 14 may be x meters from an adjacent antenna, not shown. The antenna 18 may be x meters from an adjacent antenna, not shown. The antennas, such as antennas 10, 14, and 18 may be in a line or in a circular or a rectangular pattern.

Figure 2:
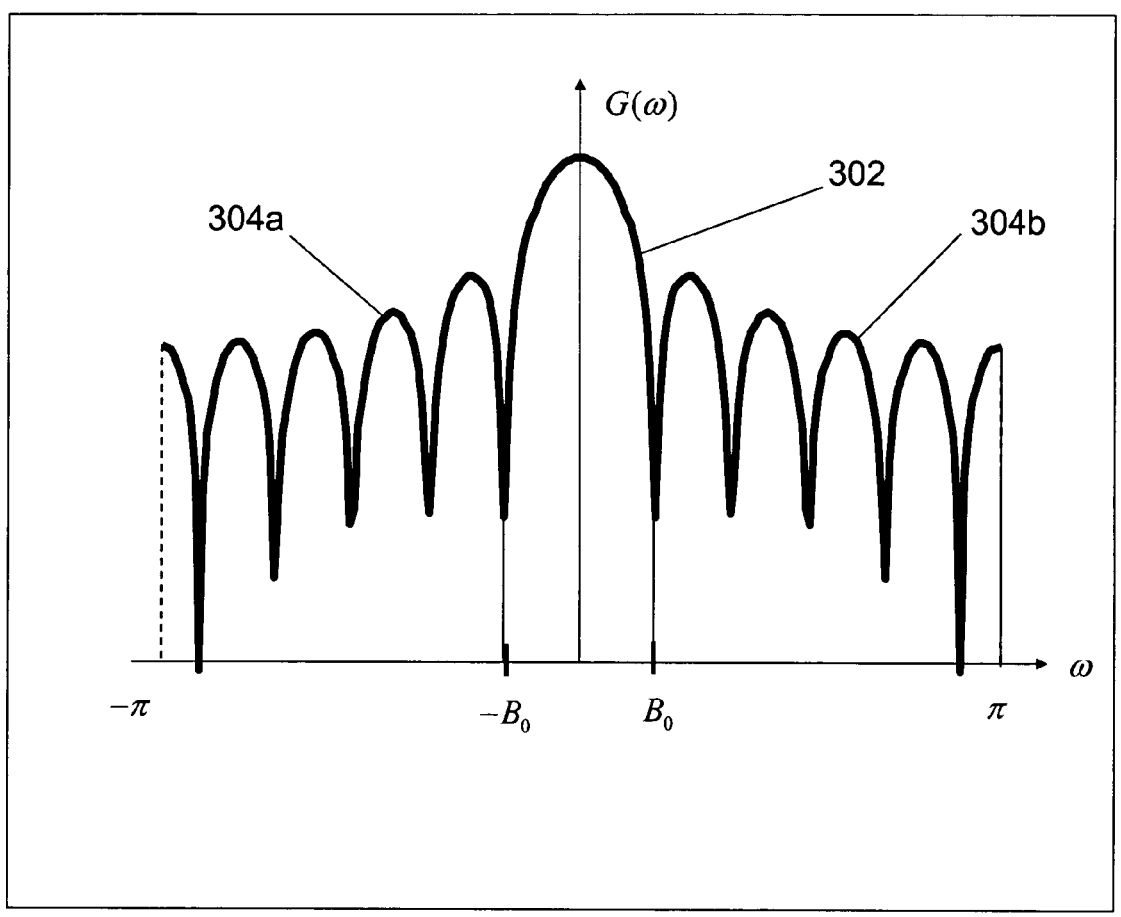
FIG. 2 shows a radar or sonar gain main beam pattern with useful bandwidth and sidelobes which satisfies a robust shading criterion, that the main beam energy is maximized within the useful bandwidth while total energy is held constant.

To maintain robustness in terms of missing sensors, the present application introduces a new energy criterion as follows. The shading weights to be applied by the shading coefficient processor 60 shown in FIG. 1*a* are selected such that the area under the curve representing the gain for the main beam 302, shown in FIG. 2, that spans a bandwidth of $(-B_0, B_0)$ in the array gain pattern is maximized while holding the total area under the curve representing the gain a constant as shown in FIG. 2. The main beam, such as main beam 302, is defined using a bandwidth. In the present case main beam is represented by the area within $(-B_0, B_0)$ in FIG. 2. The main beam area under the main beam curve 302 under the gain pattern represents the "useful portion" of the energy put out by all array of sensors 2, 4, and 8 at the outputs 40*a*, 44*a*, and 48*a*, and further outputs of further sensors not shown.

Thus the new optimization problem becomes $$\text{maximize } \frac{1}{2\pi}\int_{-B_0}^{B_0} G(\omega)d\omega, \text{ subject to } \sum_{k=1}^{M}|a_k|^2 = E. \quad (10)$$

Since the main beam is represented by the region in ($-B_0$, $B_0$) in FIG. 2, by maximizing the main beam energy from ($-B_0$, $B_0$) as in (10) while the total energy is held constant, the overall effect is to suppress the sidelobes of the gain pattern to an acceptable low level. Observe that as in the Dolph-Chebyshev design, the sidelobes may not be uniformly low outside the main beam region here; nevertheless, the sidelobes can be maintained below an acceptable level. The region from ($-B_0$, $B_0$) or region 302, represents the main beam region in FIG. 2 and this new formulation allows the main beam width $B_0$ (or two×$B_0$) to be a free parameter as well. Interestingly as shown below, this problem formulation has a complete solution.

Let $\{a_k\}_{k=1}^{M}$ represent the shading coefficients to be determined that satisfies the energy constraint introduced in (8)-(10). The problem is to optimize the shading coefficients so that the energy represented by the area under the curve 302 for the main beam of the array gain pattern in FIG. 2 is maximized subject to (9). To express the main beam energy in terms of the overall bandwidth, we introduce a rectangular window 400 over the main beam region as shown in FIG. 3.

Figure 3:
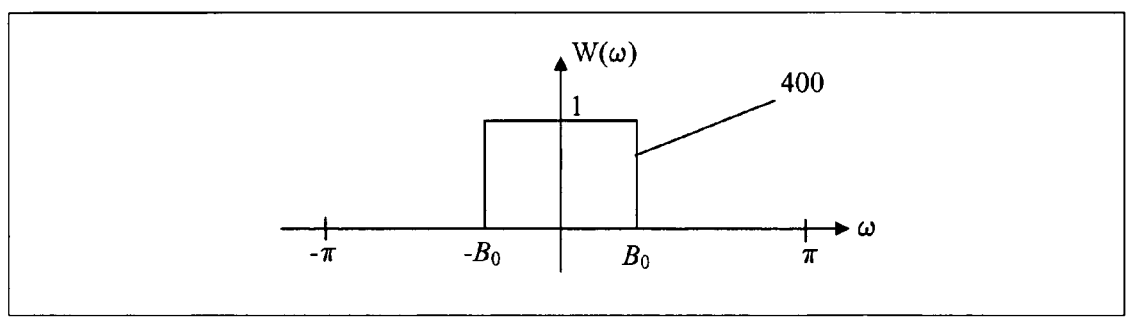
FIG. 3 shows a radar or sonar gain pattern of a main beam region of a robust shading window.

Notice that over the main beam region we have unity gain in FIG. 3 so that $$W(\omega) = \begin{cases} 1, & |\omega| \leq B_0 \\ 0, & \text{otherwise} \end{cases}, \quad (11)$$

and let $\{W_k\}$ represent the corresponding impulse response. Then $$w_k = \frac{1}{2\pi}\int_{-B_0}^{B_0} e^{jk\omega}d\omega = \frac{\sin B_0 k}{\pi k}. \quad (12)$$

From FIGS. 2 and 3, using the rectangular window $W(\omega)$ the main beam energy in (10) can be expressed as $$\frac{1}{2\pi}\int_{-B_0}^{B_0} G(\omega)d\omega = \frac{1}{2\pi}\int_{-\pi}^{\pi} W(\omega)|A(\omega)|^2 d\omega \quad (13)$$

where $A(\omega)$ represents the array factor defined in (2)-(3). The optimization problem in (10) now reduces to $$\text{maximize } \frac{1}{2\pi}\int_{-\pi}^{\pi} W(\omega)|A(\omega)|^2 d\omega, \quad (14)$$

$$\text{subject to } \sum_{k=1}^{M}|a_k|^2 = E.$$

To solve Eq. (14), once again we can make use of Parsevals' theorem. Towards this, define $$W(\omega)A(\omega) = Q(\omega) \Leftrightarrow \{q_n\}, \quad (15)$$

where $\{q_n\}$ represents the inverse Fourier transform sequence obtained in the spatial domain. By convolution theorem applied to (15), the impulse response $\{q_n\}$ is given by $$q_n = \sum_{k=1}^{M} w_{n-k} a_k \quad (16)$$

and from (14) by Parseval's theorem $$\frac{1}{2\pi}\int_{-\pi}^{\pi} W(\omega)|A(\omega)|^2 d\omega = \frac{1}{2\pi}\int_{-\pi}^{\pi} Q(\omega)A^*(\omega)d\omega = \sum_{n=1}^{M} q_n a_n^*, \quad (17)$$

where we used the finite size of the shading weights in the summation. Applying Cauchy-Schwarz' inequality to the right side of (17) we get $$\frac{1}{2\pi}\int_{-\pi}^{\pi} W(\omega)|A(\omega)|^2 d\omega = \sum_{n=1}^{M} q_n a_n^* \leq \sqrt{\sum_n |q_n|^2 \sum_{n=1}^{M} |a_n|^2} \quad (18)$$

and equality is achieved in (18) if and only if $$q_n = \lambda a_n. \quad (19)$$

Finally, substituting (16) into (19), the maximum main lobe energy condition in (14) translates into $$\sum_{k=1}^{M} w_{n-k} a_k = \lambda a_n, \quad n = 1, 2, L, M.; \quad (20)$$

$$\sum_{i=1}^{M} |a_i|^2 = E$$

Equation (20) has a convenient matrix representation given by $$Wa = \lambda a; \quad a^T a = E \quad (21)$$

where using (12)

$$W_{i,j} = w_{i-j} = \frac{\sin(i-j)B_0}{\pi(i-j)} \quad (22)$$

and $$a = [a_1, a_2, L, a_M]^T. \quad (23)$$

Equation (21) represents an eigenvalue-eigenvector equation for the symmetric positive definite Toeplitz matrix W. Under this optimum solution, with (19) in (18), the maximum main lobe energy becomes $$\max \frac{1}{2\pi} \int_{-B_0}^{B_0} G(\omega) d\omega = \frac{\max}{a_i} \frac{1}{2\pi} \int_{-\pi}^{\pi} W(\omega)|A(\omega)|^2 d\omega \qquad (24)$$

$$= \frac{\max}{a_i} \lambda E, \text{ subject to } a^T a = E$$

and from (21)-(24) to maximize the main beam energy, $\lambda$ must be chosen as the largest eigenvalue of the positive-definite Toeplitz matrix in (21). It follows that the normalized eigenvector corresponding to the largest eigenvalue in (21)-(24) represents the desired optimum shading coefficients. For the "sinc" kernel in (22), the optimum eigenvector represents the prolate-spheroidal function as disclosed by "Prolate spheroidal wave functions, Fourier analysis and uncertainty, V: The discrete case" by D. Slepian in Bell System Technical Journal, 57:1371-1430, May-June 1978.

Notice that the main beam width $B_0$ is a free parameter in (21)-(24) and it can be set to an appropriate level. By choosing the number of elements N, for the number of sensors as in FIG. 1a any desired sidelobe level can be achieved in this manner.

Other kernels can be incorporated by W by choosing nonrectangular windows in (11). For example triangular, circular window shapes can be used in (11) and they lead to different kernels.

FIG. 4a shows, through curve 502 (solid line), the optimum gain pattern for a twenty-five element or sensor uniformly placed array (similar to FIG. 1a, with twenty-five sensors) using the new method proposed above [Eqs. (21)-(24)]. In this case we have chosen $B_0=0.2$. For comparison purposes the prior art Dolph-Chebyshev gain pattern with sixty-five dB sidelobe level in curve 504 (dotted line) is also plotted in FIG. 4a. Notice that both gain patterns are comparable in FIG. 4a. FIG. 4b shows the recomputed optimum shading weights using the new method.

What if the $m^{th}$ sensor—say the $5^{th}$ sensor—is missing? How does the present method update shading vectors so that the degradation in the gain pattern is graceful (i.e. not abrupt or not too much degradation)? Interestingly, as shown below the method proposed here can be easily adapted to address the missing sensor element problem.

Suppose the $m^{th}$ sensor is missing. In that case the remaining weights $\{a_k\}_{k=0}^{M}$, $a_m=0$, must be readjusted so that the main beam energy is still maximized in (14). Proceeding as in (15)-(23), this leads to the following optimization problem: Solve for the normalized vector $\{a_k\}_{k=1}^{M}$, $a_m=0$, so that $\lambda_1$ is maximized in (25) below.

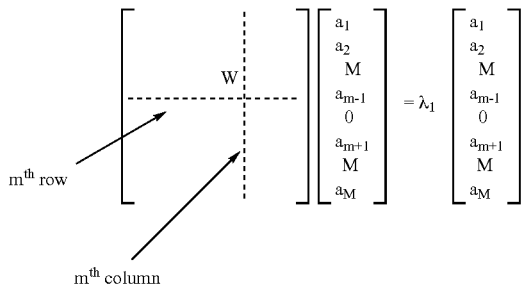

To respect the condition that $a_m=0$ in the eigenvector solution in (25), interestingly, we can solve the reduced eigen problem obtained by deleting the $m^{th}$ row and $m^{th}$ column of W. Thus let $W_i=W[m_1,m_2,L,m_i]$ represent the matrix that is obtained from W by deleting its i rows and i columns corresponding to locations, $m_1,m_2,L,m_i$. In that representation $$W_1=W[m_1] \qquad (26)$$

represents the (M−1)×(M−1) matrix obtained by deleting the $m_1^{th}$ row and column of W. Notice that W positive definite implies $W_1$ is also positive definite and using $W_1$, we can rewrite Eq. (25) as $$W_1 b = \lambda_1 b, \qquad (27)$$

where $$b=[a_1,a_2,L,a_{m-2},a_{m-1},a_{m+1},a_{m+2},L,a_M]^T. \qquad (28)$$

Once again the eigenvector corresponding to the largest eigenvalue of the reduced matrix $W_1$ in (27) represents the new shading coefficients and they can be used to recompute the new shading pattern.

FIG. 5a shows the degraded pattern for a twenty-five element array case considered in FIG. 4a with the fifth sensor non-operational and the improvement that can be obtained using the new scheme described in (27).

FIG. 5a shows, through curve 602 (solid line), the improvement that can be obtained in the array gain pattern by recomputing the shading weights using (27) with the fifth element missing for a twenty-five element uniform array. For comparison purposes the degraded gain pattern without recalculating the weights is also shown in FIG. 5a as a curve 604 (dotted line). The sidelobes for curve 604 are reduced by about thirty-eight dB from the main beam. In contrast, using a method in accordance with the present invention, the sidelobes for curve 602 are reduced by anywhere from about fifty-five to more than sixty dB from the main beam. In addition, the recomputed shading weights are also tabulated in FIG. 5b. Notice that the new technique is able to pull the sidelobe level down to about −60 dB (compared to about −35 dB without compensating for the missing sensor).

FIG. 6a shows yet another comparison of array gain patterns for an eighty-one element uniform array using the new method (eq. (21)) through curve 702 (solid line) and prior art Dolph-Chebyshev gain pattern with about −110 dB sidelobe attenuation level through curve 704 (dotted line). Both curves 702 and 704 have the same main beam bandwidth. Note that in FIG. 6a the gain patterns are shown with all elements present.

FIG. 6b shows the array gain patterns when the sixty-fifth sensor element is non-operational (or missing) for the array in FIG. 6a. A curve 802 (solid line) represents a new method in accordance with the present invention using the recomputed shading coefficients as in (27), and a curve 804 (dotted line) represents prior art Dolph-Chebyshev gain pattern with −110 dB sidelobe attenuation level (with the $65^{th}$ sensor missing). The pattern of the prior art reduces sidelobes about 50 dB from the main beam as shown by curve 804 while the pattern of the present invention reduces sidelobes by about 100 dB or more as shown by the curve 802. The present invention reduces sidelobe levels by about fifty dB more compared to the conventional degraded pattern.

Interestingly the method proposed here can be used to readjust shading weights with multiple missing sensors as well. In general if sensors $m_1,m_2,L,m_i$ are missing, the shading weights must be recomputed subject to the condition $$a_{m_1}=a_{m_2}=L=a_{m_i}=0 \qquad (29)$$

In that case once again maximization of the main lobe energy in $(-B_0, B_0)$ leads to the following eigen problem:

$$W \begin{bmatrix} a_1 \\ a_2 \\ M \\ a_{m_1} = 0 \\ a_{m_1+1} \\ M \\ a_{m_2} = 0 \\ M \\ a_M \end{bmatrix} = \lambda_i \begin{bmatrix} a_1 \\ a_2 \\ M \\ a_{m_1} = 0 \\ a_{m_1+1} \\ M \\ a_{m_2} = 0 \\ M \\ a_M \end{bmatrix}, \text{ subject to } \sum_{i=1}^{N} |a_i|^2 = E \quad (30)$$

Proceeding as in (26), let $W_i$ represent the $(M-i) \times (M-i)$ matrix obtained from $W$ by deleting its $m_1, m_2, L, m_i$ rows and columns. Thus $$W_i = W[m_1, m_2, L, m_i] \quad (31)$$

and (30) can be rewritten as $$W_i c = \lambda_i c, \quad (32)$$

where $$c = [a_1, a_2, L, a_{m_1-1}, a_{m_1+1}, L, a_{m_2-1}, a_{m_2+1}, L, a_M]^T. \quad (33)$$

From (32)–(33), the eigenvector corresponding to the largest eigenvalue in (32) represents the non zero optimum weights in this case.

FIG. 7a shows an array gain patterns for a fifty-one element array when all sensors are present. A curve 902 (solid line) represents a new method in accordance with the present invention using (21) and a curve 904 (dotted line) represents the prior art Dolph-Chebyshev gain pattern with –75 dB sidelobe attenuation level. Both methods have the same main beam bandwidth.

FIG. 7b shows a two missing sensors situation in the case of a fifty-one element array (in FIG. 7a) with the 6$^{th}$ and 17$^{th}$ sensors missing. A curve 1002 (solid line) represents the new method in accordance with an embodiment of the present invention with the 6$^{th}$ and 17$^{th}$ sensors missing. The curve 1004 (dotted line) represents the prior art Dolph-Chebyshev gain pattern with a –75 dB sidelobe attenuation level with the same 6$^{th}$ and 17$^{th}$ sensors missing. Observe that with the recomputed shading weights, the reduction in the sidelobe level is above thirty dB, i.e., the sidelobes of curve 1002 are about –60 dB or more (reduced from the main beam) while the sidelobes of curve 1004 are about –30 dB (reduced from the main beam).

From FIGS. 6a, 6b, 7a, and 7b, a new method in accordance with an embodiment of the present invention is as efficient as prior art well-known methods in suppressing sidelobes when all sensors are present; moreover, in the absence of some sensors, the new method allows recomputation of the shading coefficients so that the degradation in the gain pattern is minimized.

The method of one or more embodiments of the present invention can be easily modified even when the sensors are non-uniformly placed; moreover recomputation of weights can be accomplished when some of these sensors are missing.

In Space Time Adaptive Processing (STAP) an M element array is used along with N consecutive temporal pulses to transmit and receive data. In the receive mode the M sensor outputs for each pulse when stacked together generate an MN×1 data vector corresponding to N pulses. The MN×1 shading coefficient vector for this data set can be determined in a similar manner. Moreover when a specific sensor becomes non-operational, the data vector and the shading vectors are reduced in size and the new shading coefficients can be recomputed using the method described here for embodiments of the present invention.

Note that FIG. 2 and FIG. 1b are simple illustrations of gain patterns. The Y-axis is a power level which is not specifically written.

Also note that FIG. 1c and FIG. 4a through FIG. 7b shows Y-axis as normalized amplitude in decibel (dB) scale. Y-axis values are converted to dB scale (10*log(xx)) before plotting. Hence in FIG. 1c curve 202 is 60 dB down or (–60 dB down). The difference between curve 204 and 202 is (–35–(–60)) is an improvement of 25 dB for curve 202. This is the way FIG. 4a to FIG. 7b are shown.

I claim:

1. A method comprising
changing one or more shading coefficients in an adaptive beamformer in response to one or more radar sensor devices becoming non-operational;
wherein the one or more radar sensor devices are part of an array of a plurality of radar sensor devices;
wherein after the one or more radar sensor devices becomes non-operational, the array is comprised of one or more non-operational radar sensor devices and one or more operational radar sensor devices;
wherein the array has a gain pattern which includes a main beam and a sidelobe;
wherein the main beam has a main beam level;
wherein the sidelobe of the gain pattern of the array is maintained below an acceptable level by changing the one or more shading coefficients;
wherein the one or more shading coefficients after being changed are applied to the one or more operational sensors;
wherein the array has a total output energy;
wherein the array has a main beam of specific bandwidth;
wherein the main beam has energy;
and wherein the one or more shading coefficients are changed by maximizing the energy In the main beam while simultaneously holding the total output energy to a constant;
and further comprising superimposing a non-negative window of specific width and of any arbitrary shape over the main beam to maximize the energy in the main beam and to hold the total output energy constant in beamformer; and
wherein the shading coefficients changed to correspond to value of a unique eigenvector associated with a largest eigenvalue of a kernel matrix.

2. The method of claim 1 wherein
the step of superimposing the non negative window highlights the main beam while holding the total array output energy to be a constant to generate a kernel matrix.

3. The method of claim 1 wherein
the shading coefficients are changed to correspond to entries of a unique eigenvector associated with a largest elgenvalue of a non-negative definite kernel matrix.

4. The method of claim 1 wherein
the kernel matrix is a non-negative definite matrix whose entries are obtained by applying the inverse Fourier transform on the non-negative window function being superimposed over the main beam and evaluating the inverse Fourier transform to generate the kernel matrix.

5. The method of claim 1 wherein the kernel matrix is a non-negative Toeplitz matrix whose entries are obtained by applying the inverse Fourier transform on the non-negative window function being superimposed over the main beam; and
wherein the width of the main beam is a free design parameter.

6. The method of claim 1 wherein the non-negative window is comprised of any arbitrary non-negative window applied to the main beam region of the array of radar sensor devices to generate a kernel matrix.

7. The method of claim 6 wherein the non-negative window is a rectangular window.

8. The method of claim 6 wherein the non-negative window is a triangular window.

9. The method of claim 6 wherein the non-negative window is a sinc window.

10. The method of claim 6 wherein the non-negative window is a raised cosine window;
wherein the non-negative window is of any arbitrary shape over the main beam and zero outside that region.

11. The method of claim 1 wherein the array is an airborne radar array.

12. The method of claim 1 wherein the array is a space based radar array.

13. The method of claim 1 wherein the array is a ground based radar array.

* * * * *

UNITED STATES PATENT AND TRADEMARK OFFICE
CERTIFICATE OF CORRECTION

| | | |
|---|---|---|
| PATENT NO. | : 7,280,070 B2 | Page 1 of 6 |
| APPLICATION NO. | : 11/000156 | |
| DATED | : October 9, 2007 | |
| INVENTOR(S) | : Unnikrishna Sreedharan Pillai | |

It is certified that error appears in the above-identified patent and that said Letters Patent is hereby corrected as shown below:

In col. 9, ln. 51 – col. 9, ln. 63, replace:

"

$$\left[\begin{array}{c|c} & \\ & \\ & W \\ \hline & \\ & \\ \end{array}\right] \left[\begin{array}{c} a_1 \\ a_2 \\ M \\ a_{m-1} \\ 0 \\ a_{m+1} \\ M \\ a_M \end{array}\right] = \lambda_1 \left[\begin{array}{c} a_1 \\ a_2 \\ M \\ a_{m-1} \\ 0 \\ a_{m+1} \\ M \\ a_M \end{array}\right]$$

$m^{th}$ row $m^{th}$ column

"

with:

--

$$\left[\begin{array}{c|c} & \\ & \\ & W \\ \hline & \\ & \\ \end{array}\right] \left[\begin{array}{c} a_1 \\ a_2 \\ \vdots \\ a_{m-1} \\ 0 \\ a_{m+1} \\ \vdots \\ a_M \end{array}\right] = \lambda_1 \left[\begin{array}{c} a_1 \\ a_2 \\ \vdots \\ a_{m-1} \\ 0 \\ a_{m+1} \\ \vdots \\ a_M \end{array}\right]$$

$m^{th}$ row $m^{th}$ column

--

UNITED STATES PATENT AND TRADEMARK OFFICE
CERTIFICATE OF CORRECTION

PATENT NO. : 7,280,070 B2
APPLICATION NO. : 11/000156
DATED : October 9, 2007
INVENTOR(S) : Unnikrishna Sreedharan Pillai It is certified that error appears in the above-identified patent and that said Letters Patent is hereby corrected as shown below:

In col. 9, ln. 65 – col. 10, ln. 4 replace:

"To respect the condition that $a_m = 0$ in the eigenvector solution in (25), interestingly, we can solve the reduced eigen problem obtained by deleting the $m^{th}$ row and $m^{th}$ column of W. Thus let $W_i = W[m_1, m_2, L, m_i]$ represent the matrix that is obtained from W by deleting its i rows and i columns corresponding to locations $m_1, m_2, L, m_i$. In that representation"

with:

-- To respect the condition that $a_m = 0$ in the eigenvector solution in (25), interestingly, we can solve the reduced eigen problem obtained by deleting the $m^{th}$ row and $m^{th}$ column of W. Thus let $W_i = W[m_1, m_2, \cdots, m_i]$ represent the matrix that is obtained from W by deleting its i rows and i columns corresponding to locations $m_1, m_2, \ldots, m_i$. In that representation --

In col. 10, lns. 15-16, replace:

"$b = [a_1, a_2, L, a_{m-2}, a_{m-1}, a_{m+1}, a_{m+2}, L, a_M]^T$   (28)"

with:

-- $b = [a_1, a_2, \ldots, a_{m-2}, a_{m-1}, a_{m+1}, a_{m+2}, \ldots, a_M]^T$.   (28) --

UNITED STATES PATENT AND TRADEMARK OFFICE
CERTIFICATE OF CORRECTION

PATENT NO. : 7,280,070 B2
APPLICATION NO. : 11/000156
DATED : October 9, 2007
INVENTOR(S) : Unnikrishna Sreedharan Pillai It is certified that error appears in the above-identified patent and that said Letters Patent is hereby corrected as shown below:

In col. 10, lns. 67-68, replace:

"$a_{m_1} = a_{m_2} = L = a_{m_i} = 0 \qquad (29)$"

with:

-- $a_{m_1} = a_{m_2} = \cdots = a_{m_i} = 0 \qquad (29)$ --

UNITED STATES PATENT AND TRADEMARK OFFICE
CERTIFICATE OF CORRECTION

PATENT NO.       : 7,280,070 B2
APPLICATION NO.  : 11/000156
DATED            : October 9, 2007
INVENTOR(S)      : Unnikrishna Sreedharan Pillai It is certified that error appears in the above-identified patent and that said Letters Patent is hereby corrected as shown below:

In col. 11, lns. 5-15, replace:

"
$$W \begin{bmatrix} a_1 \\ a_2 \\ M \\ a_{m_1} = 0 \\ a_{m_1+1} \\ M \\ a_{m_2} = 0 \\ M \\ a_M \end{bmatrix} = \lambda_i \begin{bmatrix} a_1 \\ a_2 \\ M \\ a_{m_1} = 0 \\ a_{m_1+1} \\ M \\ a_{m_2} = 0 \\ M \\ a_M \end{bmatrix}, \text{ subject to } \sum_{i=1}^{N} |a_i|^2 = E \quad (30)$$
"

with:

--
$$W \begin{bmatrix} a_1 \\ a_2 \\ \vdots \\ a_{m_1} = 0 \\ a_{m_1+1} \\ \vdots \\ a_{m_2} = 0 \\ \vdots \\ a_M \end{bmatrix} = \lambda_i \begin{bmatrix} a_1 \\ a_2 \\ \vdots \\ a_{m_1} = 0 \\ a_{m_1+1} \\ \vdots \\ a_{m_2} = 0 \\ \vdots \\ a_M \end{bmatrix}, \text{ subject to } \sum_{i=1}^{N} |a_i|^2 = E \quad (30)$$
--

UNITED STATES PATENT AND TRADEMARK OFFICE
CERTIFICATE OF CORRECTION

PATENT NO.         : 7,280,070 B2
APPLICATION NO. : 11/000156
DATED              : October 9, 2007
INVENTOR(S)      : Unnikrishna Sreedharan Pillai It is certified that error appears in the above-identified patent and that said Letters Patent is hereby corrected as shown below:

In col. 11, lns. 17-21, replace:

"Proceeding as in (26), let $W_i$ represent the $(M-i) \times (M-i)$ matrix obtained from W by deleting its $m_1, m_2, \ldots, m_i$ rows and columns. Thus $$W_i = W[m_1, m_2, L, m_i] \qquad (31)$$ "

with:

-- Proceeding as in (26), let $W_i$ represent the $(M-i) \times (M-i)$ matrix obtained from W by deleting its $m_1, m_2, \ldots, m_i$ rows and columns. Thus $$W_i = W[m_1, m_2, \cdots, m_i] \qquad (31)$$ --

UNITED STATES PATENT AND TRADEMARK OFFICE
CERTIFICATE OF CORRECTION

PATENT NO. : 7,280,070 B2
APPLICATION NO. : 11/000156
DATED : October 9, 2007
INVENTOR(S) : Unnikrishna Sreedharan Pillai It is certified that error appears in the above-identified patent and that said Letters Patent is hereby corrected as shown below:

In col. 11, lns. 27-28, replace:

" $c = \begin{bmatrix} a_1, & a_2, & L, & a_{m_1-1}, & a_{m_1+1}, & L, & a_{m_2-1}, & a_{m_2+1}, & L, & a_M \end{bmatrix}^T$ (33)"

with:

-- $c = \begin{bmatrix} a_1, a_2, \cdots, a_{m_1-1}, a_{m_1+1}, \cdots, a_{m_2-1}, a_{m_2+1}, \cdots, a_M \end{bmatrix}^T .$ (33) --

Signed and Sealed this

Fourth Day of March, 2008

JON W. DUDAS
*Director of the United States Patent and Trademark Office*